United States Patent
Lu et al.

(10) Patent No.: US 10,785,814 B2
(45) Date of Patent: Sep. 22, 2020

(54) METHOD, DEVICE AND SYSTEM FOR SENDING PARTICIPATING SERVICE PROVIDER IDENTITY

(71) Applicant: BAICELLS TECHNOLOGIES CO. LTD., Beijing (CN)

(72) Inventors: Yang Lu, Beijing (CN); Li Wang, Beijing (CN)

(73) Assignee: BAICELLS TECHNOLOGIES CO. LTD., Beijing (CN)

( * ) Notice: Subject to any disclaimer, the term of this patent is extended or adjusted under 35 U.S.C. 154(b) by 54 days.

(21) Appl. No.: 16/093,581

(22) PCT Filed: Apr. 14, 2017

(86) PCT No.: PCT/CN2017/080524
§ 371 (c)(1),
(2) Date: Oct. 12, 2018

(87) PCT Pub. No.: WO2017/177959
PCT Pub. Date: Oct. 19, 2017

(65) Prior Publication Data
US 2019/0174562 A1    Jun. 6, 2019

(51) Int. Cl.
*H04W 76/11* (2018.01)
*H04L 29/08* (2006.01)
(Continued)

(52) U.S. Cl.
CPC ........... *H04W 76/11* (2018.02); *H04L 1/0061* (2013.01); *H04L 63/0892* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

2007/0202874 A1* 8/2007 Shon .................. H04W 4/06
                                                           455/433
2010/0067367 A1* 3/2010 Choi ................... H04L 5/0064
                                                           370/210
(Continued)

FOREIGN PATENT DOCUMENTS

CN          1802839 A  *  7/2006 ............ H04W 84/12
CN        101299868 A  * 11/2008 ......... H04L 12/2867
(Continued)

OTHER PUBLICATIONS

Method, Device and System for Sending Participating Service Provider Identity, Baicells Technologies Co. Ltd., Apr. 14, 2017.*
(Continued)

*Primary Examiner* — Peter G Solinsky
*Assistant Examiner* — Sanjay K Dewan
(74) *Attorney, Agent, or Firm* — Christensen O'Connor Johnson Kindness PLLC

(57) ABSTRACT

The present disclosure discloses a method, device and system for transmitting a participating service provider identity. The method includes: parsing a previously received broadcast that is transmitted by a Neutral Host (NH) network access device to determine whether a first short PSP identity corresponding to a long PSP identity to be accessed exists in a first short PSP identity list in the broadcast; transmitting a first communication protocol message to the NH network access device when it is determined that the first short PSP identity exists in the first short PSP identity list; and acquiring a second communication protocol message transmitted by the NH network access device, the second communication protocol message indicating whether an NH network supports the long PSP identity.

20 Claims, 7 Drawing Sheets

(51) Int. Cl.
- *H04L 1/00* (2006.01)
- *H04W 16/14* (2009.01)
- *H04W 76/27* (2018.01)
- *H04W 88/08* (2009.01)
- *H04L 29/06* (2006.01)
- *H04W 28/06* (2009.01)
- *H04W 24/02* (2009.01)
- *H04W 48/12* (2009.01)

(52) U.S. Cl.
CPC .............. *H04L 67/20* (2013.01); *H04W 16/14* (2013.01); *H04W 28/06* (2013.01); *H04W 76/27* (2018.02); *H04W 88/085* (2013.01); *H04W 24/02* (2013.01); *H04W 48/12* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2017/0311243 | A1* | 10/2017 | Rinne | ................... H04W 48/18 |
| 2019/0174314 | A1* | 6/2019 | Joseph | ............ H04W 12/00403 |

FOREIGN PATENT DOCUMENTS

| | | | | |
|---|---|---|---|---|
| CN | 103139695 | A * | 6/2013 | .............. H04W 4/00 |
| CN | 104247505 | * | 12/2014 | ............ H04W 48/14 |
| CN | 104247505 | A | 12/2014 | |
| CN | 104598625 | A | 5/2015 | |
| CN | 105939522 | A * | 9/2016 | ............ H04L 1/0061 |

OTHER PUBLICATIONS

International Search Report dated Jul. 11, 2017, issued in corresponding application No. PCT/CN2017/080524, filed Apr. 14, 2017, 3 pages.

* cited by examiner

METHOD, DEVICE AND SYSTEM FOR SENDING PARTICIPATING SERVICE PROVIDER IDENTITY

CROSS-REFERENCE TO RELATED APPLICATIONS

The present application is based on International Application No. PCT/CN2017/080524 filed Apr. 14, 2017, which claims priority to Chinese Patent Application No. 201610237728.5, filed on Apr. 15, 2016, the contents of which are incorporated herein by reference in its entirety.

TECHNICAL FIELD

The present disclosure relates to the field of communication technologies, and in particular to a method, device and system for transmitting a participating service provider identity.

BACKGROUND

MuLTEFire is a new LTE-based wireless access technology which can independently operate in a unlicensed frequency spectrum without licensed frequency band carriers. As shown in FIG. 1 which is a schematic structural diagram of a Neutral Host (abbreviated as NH) network in the prior art, in a NH network mode of MuLTEFire, an MF Access Point (abbreviated as AP) is connected to a NH Core Network (abbreviated as CN). The NH CN is similar to an LTE (Long Term Evolution, abbreviated as LTE) CN of the Third Generation Partnership Project (abbreviated as 3GPP), which includes an NH mobility management element (abbreviated as MME), an NH gateway (abbreviated as GW) and an NH authentication, authorization and accounting (abbreviated as AAA) server. The NH CN introduces a uniformly planned and self-organized neutral network for MuLTEFire. A UE accessing to an NH network is authenticated and authorized by an AAA server through the extensive authentication protocol (abbreviated as EAP), but it does not support switch to a residential access network (abbreviated as RAN) of a 3GPP network.

In an NH network mode of MuLTEFire, participating service provider identities (abbreviated as PSP-ID) are introduced to support various service providers, which may be Internet service providers, cable TV service providers, mobile network operators, company and public area service providers and the like. The NH network is independent from the concept of service providers. Each MF AP belongs to one NH network and is identified by an NH network identity (abbreviated as NHN-ID). Each NH network is provided to one or more service providers.

The PSP-ID is divided into a long format and a short format. A long format PSP-ID is an unique identity of a participating service provider and can be mapped into a short format PSP-ID. The short format PSP-ID corresponding to the long format PSP-ID can be obtained by compression using HASH algorithms, including MD2, MD4, MD5 and SHA-1. To save radio resources, only short format PSP-IDs are transmitted in an eSIB of a system broadcast, and a maximum number of short format PSP-IDs transmitted in the system broadcast can be preset. When the number of short format PSP-IDs supported by the NH network is greater than the preset maximum number, additional PSP indication information may be added in the eSIB of the system broadcast to inform the UE that the NH network also supports additional PSPs. The UE can store license certificates of multiple long format PSP-IDs, and can access the services of multiple PSPs.

In an NH network mode of MuLTEFire, a short format PSP-ID is a reduced PSP-ID, and a long format PSP-ID is the actual one. Different long format PSP-IDs may lead to the same short format PSP-ID after compression. The User Equipment (abbreviated as UE) can determine if an NH network supports a specified PSP as long as it gets the long format PSP-ID represented by the short format PSP-ID transmitted in the broadcast or it gets the long format PSP-ID additionally supported but not broadcasted by the NH network. In the prior art, the UE can get the long format PSP-IDs supported by the NH network through a radio resource control (abbreviated as RRC) process or an NAS process. When the UE determines if the NH network supports a specified PSP through an RRC process, the short format PSP-ID corresponding to the long format PSP-ID of the PSP can be carried in an uplink RRC message sent to the MF AP, and then the MF AP sends to the UE the actually supported long format PSP-ID corresponding to the short format PSP-ID in a downlink RRC message. The UE may inquire the MF AP through an uplink RRC message if the long format PSP-ID of the PSP is supported. Then, the MF AP determines whether the long format PSP-ID is supported and feeds back a result to the UE. A long format PSP-ID may be much longer than a short format PSP-ID (e.g., 24 bytes), and may exceed 100 bytes. If a long format PSP-ID is transmitted through an RRC message, a length of the RRC message might be considerably increased. In particular, when the UE needs to report multiple long format PSP-IDs, or when the AP sends multiple long format PSP-IDs, the signaling overhead may be considerably increased, thereby lowering the network performance.

Thus, it is possible to solve the technical problem in the prior art that when a user side inquires a long PSP-ID corresponding to a short PSP-ID from the network side, the long PSP-ID needs to be sent to a network side using an RRC message, so that the length of the RRC message is increased due to the length of the long PSP-ID and thus the signaling overhead is increased and the network performance is degraded.

SUMMARY

Embodiments of the present disclosure provide a method, a device and a system for transmitting a participating service provider identity to at least solve the problem in the prior art that when a user side inquires a long PSP-ID corresponding to a short PSP-ID from the network side, the long PSP-ID needs to be sent to a network side using an RRC message, so that the length of the RRC message is increased due to the length of the long PSP-ID and thus the signaling overhead is increased and the network performance is degraded.

According to an aspect of the embodiments of the present disclosure, a method for transmitting a Participating Service Provider (PSP) identity is provided. The method includes: parsing a previously received broadcast that is transmitted by a Neutral Host (NH) network access device to determine whether a first short PSP identity corresponding to a long PSP identity to be accessed exists in a first short PSP identity list in the broadcast; transmitting a first communication protocol message to the NH network access device when it is determined that the first short PSP identity exists in the first short PSP identity list, the first communication protocol message carrying compressed information of the long PSP identity to be accessed; and acquiring a second communication protocol message transmitted by the NH network access device, the second communication protocol message indicating whether an NH network supports the long PSP identity.

According to another aspect of the embodiments of the present disclosure, a method for transmitting a Participating Service Provider (PSP) identity is provided. The method includes: transmitting a broadcast indicating short PSP identities corresponding to long PSP identities supported by a Neutral Host (NH) network access device; receiving a first communication protocol message returned from a client, the first communication protocol message carrying compressed information of a long PSP identity to be accessed; and generating a second communication protocol message based on the first communication protocol message, the second communication protocol message indicating whether the NH network supports the long PSP identity.

According to yet another aspect of the embodiments of the present disclosure, a device for transmitting a Participating Service Provider (PSP) identity is provided. The device includes: an information parsing means configured to parse a previously received broadcast that is transmitted by a Neutral Host (NH) network access device to determine whether a first short PSP identity corresponding to a long PSP identity to be accessed exists in a first short PSP identity list in the broadcast; an information transmitting means configured to transmit a first communication protocol message to the NH network access device when it is determined that the first short PSP identity exists in the first short PSP identity list, the first communication protocol message carrying compressed information of the long PSP identity to be accessed; and an information receiving means configured to acquire a second communication protocol message transmitted by the NH network access device, the second communication protocol message indicating whether an NH network supports the long PSP identity.

According to still another aspect of the embodiments of the present disclosure, a device for transmitting a Participating Service Provider (PSP) identity is provided. The device includes: an information transmitting means configured to transmit a broadcast indicating short PSP identities corresponding to long PSP identities supported by a Neutral Host (NH) network access device; an information receiving means configured to receive a first communication protocol message returned from a client, the first communication protocol message carrying compressed information of a long PSP identity to be accessed; and an information generating means configured to generate a second communication protocol message based on the first communication protocol message, the second communication protocol message indicating whether the NH network supports the long PSP identity.

According to still yet another aspect of the embodiments of the present disclosure, a system for transmitting a Participating Service Provider (PSP) identity is provided. The system includes: a Neutral Host (NH) network access device and a client which are communicatively connected with each other. The client is the device for transmitting a PSP identity as described above, and the NH network access device is the device for transmitting a PSP identity as described above.

Embodiments of the present disclosure provide a non-transitory computer-readable storage medium storing computer instructions causing a computer to perform the above method for transmitting a participating service provider (PSP) identity of the present disclosure.

Embodiments of the present disclosure provide a computer program product, including a computer program stored on a non-transitory computer readable storage medium, the computer program including program instructions which, when executed by a computer, cause the computer to perform the above method for transmitting a participating service provider (PSP) identity of the present disclosure.

Embodiments of the present disclosure provide another non-transitory computer-readable storage medium storing computer instructions causing a computer to perform the above method for transmitting a participating service provider (PSP) identity of the present disclosure.

Embodiments of the present disclosure provide another computer program product, including a computer program stored on a non-transitory computer readable storage medium, the computer program including program instructions which, when executed by a computer, cause the computer to perform the above method for transmitting a participating service provider (PSP) identity of the present disclosure.

Embodiments of the present disclosure provide an electronic device including at least one processor and a memory communicatively connected to the at least one processor, wherein the memory stores instructions executable by the at least one processor to perform the above method for transmitting a participating service provider (PSP) identity of the present disclosure.

Embodiments of the present disclosure provide another electronic device including at least one processor and a memory communicatively connected to the at least one processor, wherein the memory stores instructions executable by the at least one processor to perform the above method for transmitting a participating service provider (PSP) identity of the present disclosure.

In the embodiments of the present disclosure, a previously received broadcast that is transmitted by a Neutral Host (NH) network access device is parsed to determine whether a first short PSP identity corresponding to a long PSP identity to be accessed exists in a first short PSP identity list in the broadcast. If so, a first communication protocol message is transmitted to the NH network access device. A second communication protocol message transmitted by the NH network access device is acquired, the second communication protocol message indicating if an NH network supports the long PSP identity. In this way, the signaling overhead for transmitting the long PSP-ID is reduced, so that an RRC message is shortened, the overall signaling overhead is reduced and the network performance is improved. Thus, it is possible to solve the technical problem in the prior art that when a user side inquires a long PSP-ID corresponding to a short PSP-ID from the network side, the long PSP-ID needs to be sent to a network side using an RRC message, so that the length of the RRC message is increased due to the length of the long PSP-ID and thus the signaling overhead is increased and the network performance is degraded.

BRIEF DESCRIPTION OF DRAWINGS

The accompanying drawings described here are intended to facilitate understanding of the present disclosure, and constitute a part of the present disclosure. The embodiments of the present disclosure and their descriptions are used to explain, rather than limiting, the present disclosure. In the drawings.

DESCRIPTION OF EMBODIMENTS

Figure 1:
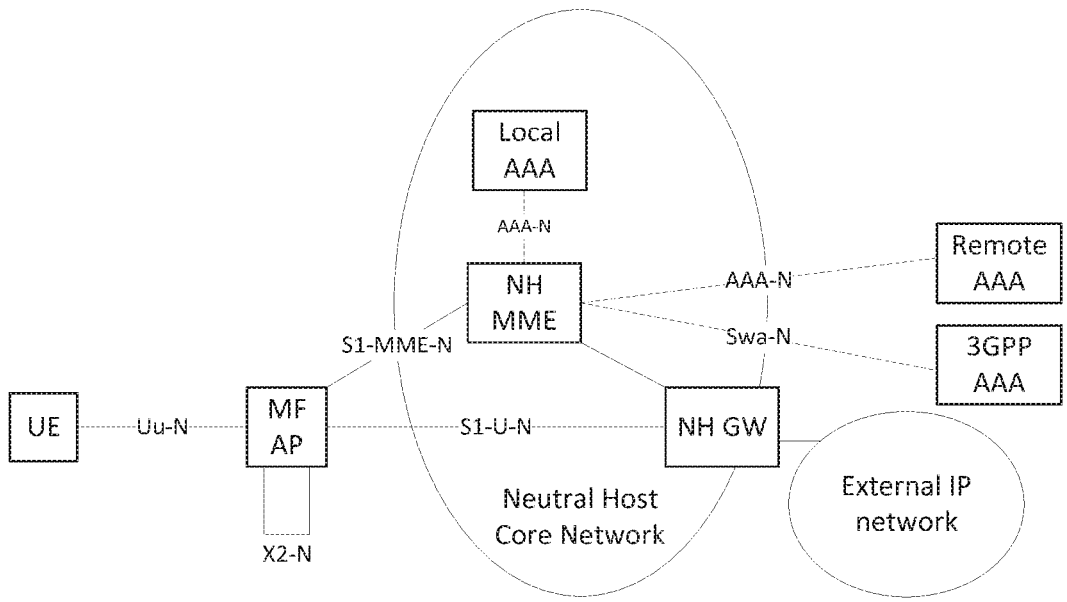
FIG. 1 is a schematic structural diagram of an NH network in the prior art.

In order to make those skilled in the art better understand the solution of the present disclosure, the technical solutions in the embodiments of the present disclosure are clearly and completely described in the following with reference to the accompanying drawings in the embodiments of the present disclosure. It is apparent that the described embodiments are only part of the embodiments of the present disclosure, but not all of them. All other embodiments obtained by those of ordinary skill in the art based on the embodiments of the present disclosure without any creative effort shall fall within the scope of protection of the present disclosure.

It should be noted that the terms "first", "second" and the like in the description and claims, as well as the above-mentioned drawings, of the present disclosure are used to distinguish similar objects, but not necessarily used to describe a specific order or precedence order. It should be understood that data used in this way may be interchanged where appropriate so that the embodiments of the present disclosure described herein can be implemented in a sequence other than those illustrated or described herein. Furthermore, the terms "including" and "having" and any variants thereof are intended to cover non-exclusive inclusions. For example, a process, method, system, product, or device that includes a series of steps or units is not necessarily limited to those steps or units that are clearly listed, but may include other steps or units that are not clearly listed or are inherent to such processes, methods, products, or devices.

Technical Terminologies Involved in the Embodiments of the Present Disclosure Access Point of MF: Access Point of MuLTEFire, i.e., Access Point or AP for short;

PSP-ID: Participating Service Provider Identity;

Radio Resource Control protocol: RRC for short (A long PSP-ID is an unique identity of a participating service provider (PSP) and can be mapped into short format PSP-IDs. The short PSP-IDs corresponding to the long PSP-ID may be obtained by means of compression using a HASH algorithm. In an embodiment of the present disclosure, a first short PSP-ID corresponding to the long PSP-ID may be a short PSP-ID corresponding to a long PSP-ID to be accessed as calculated using a first preset HASH algorithm, and a second short PSP-ID corresponding to the long PSP-ID is a cyclic redundancy check (CRC) code sequence for a binary sequence of the long PSP-ID, or a short PSP-ID corresponding to the long PSP-ID as calculated using a second preset HASH algorithm. In the embodiment of the present disclosure, the first short PSP-ID is referred to as the first short participating service provider identity, and the second short PSP-ID is referred to as the second participating service provider PSP identity); and Neutral Host network mode: NH network mode.

Embodiment 1

According to the embodiment of the present disclosure, there is provided a method for transmitting a participating service provider (PSP) identity. It should be noted that the steps shown in the flowchart of the accompanying drawings may be executed in, for example, a computer system including a set of computer executable instructions. In addition, although a logical sequence is shown in the flowchart, in some cases, the steps shown or described may be performed in an order different from the one described herein.

Figure 2:
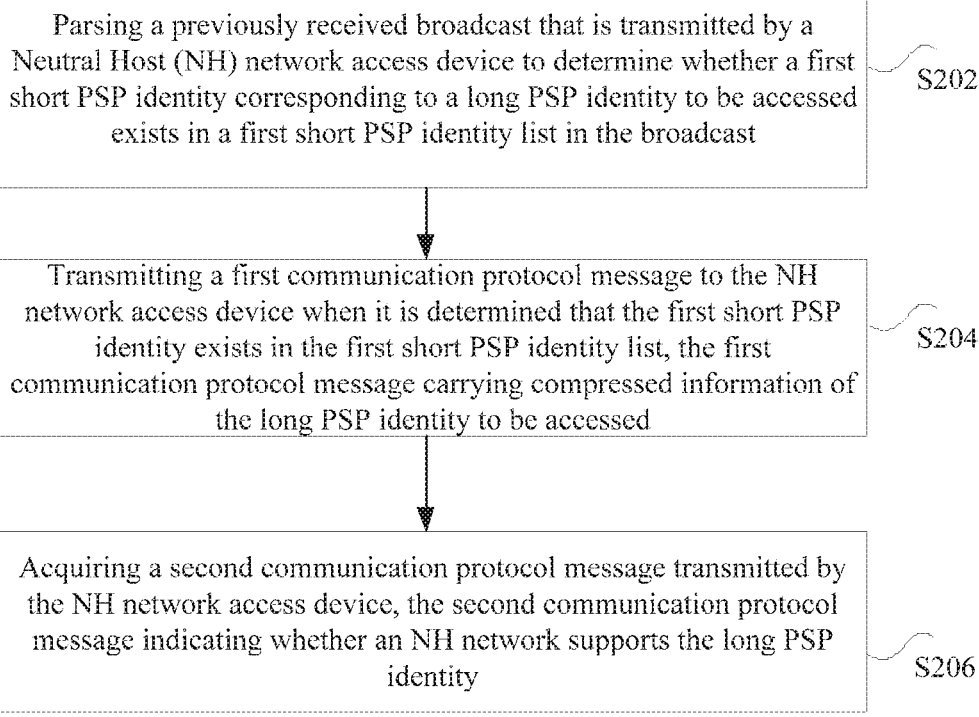
FIG. 2 is a flowchart of a method for transmitting a participating service provider (PSP) identity according to an embodiment of the present disclosure.

FIG. 2 is a flowchart of a method for transmitting a participating service provider (PSP) identity according to an embodiment of the present disclosure. At a client side, as shown in FIG. 2, the method includes the following steps.

At step S202, a previously received broadcast that is transmitted by a neutral host (NH) network access device is parsed to determine whether a first short PSP identity corresponding to a long PSP identity to be accessed exists in a first short PSP identity list in the broadcast.

Particularly, the method for transmitting the participating service provider identity provided by the embodiment of the present disclosure may be applied to the MuLTEFire technology, and specially, may be applied to a neutral host (NH) network. At the client side, the client parses a previously received broadcast that is transmitted by a neutral host (NH) network access device, and determines whether a first short PSP identity corresponding to a long PSP identity to be accessed exists in a first short PSP identity list in the broadcast. The client in the present embodiment of the present disclosure may be a mobile phone (or a smart phone), or other devices capable of transmitting or receiving a wireless signal, including user equipment (terminal), a personal digital assistant (PDA), a wireless modulator, a wireless communication device, a handheld device, a laptop computer, a cordless phone, a wireless local loop (WLL) station, customer premise equipment (CPE) or a portable broadband wireless device (Mifi) capable of converting a mobile signal into a Wi-Fi signal, a smart home appliance, other equipment capable of spontaneously communicating with a mobile communication network without a human operation, and the like. The neutral host (NH) network access device in the embodiment of the present disclosure may be an access point (AP) with the MF technology. The AP may be a macro base station, a pico base station, a node B, an enhanced base station (ENB), a home enhanced base station (Femto eNB or Home eNode B or Home eNB or (ENB), a relay station, an access point, a radio remote unit (RRU), a radio remote head (RRH), or the like. The NH network access device in the following steps is referred to as an AP.

The first short PSP identity is a sequence obtained by applying a first preset HASH algorithm to the long PSP identity.

In step S204, when it is determined that the first short PSP identity exists in the first short PSP identity list, a first communication protocol message is transmitted to the NH network access device. The first communication protocol message carries compressed information of the long PSP identity to be accessed.

Particularly, based on the determination result in step S202, after determining that the first short PSP identity corresponding to the long PSP identity to be accessed exists in a first short PSP identity list in the broadcast, the client transmits the first communication protocol message carrying compressed information of the long PSP identity to be accessed to an AP to further determine if the AP supports the long PSP identity to be accessed. The first communication protocol message may be a radio resource control (RRC) message.

In step S206, a second communication protocol message transmitted by the NH network access device is acquired, the second communication protocol message indicating whether an NH network supports the long PSP identity.

Particularly, the client receives a second communication protocol message transmitted by the AP after transmitting the first communication protocol message to the AP in step S204 to determine whether the NH network supports the long PSP identity based on the acquired second communication protocol message. When it is determined that the NH network does not support the long PSP identity according to the second communication protocol message, the client will select another NH network.

If the client determines that the NH network supports the long PSP identity according to the second communication protocol message, it can determine whether to access the NH network based on not only the long PSP identity but also a current usage situation. If the NH network corresponding to the long PSP identity is not accessed, another NH network is selected.

In the method for transmitting a participating service provider (PSP) identity provided by this embodiment of the present disclosure, a previously received broadcast that is transmitted by a Neutral Host (NH) network access device is parsed to determine whether a first short PSP identity corresponding to a long PSP identity to be accessed exists in a first short PSP identity list in the broadcast. If so, a first communication protocol message is transmitted to the NH network access device. A second communication protocol message transmitted by the NH network access device is acquired, the second communication protocol message indicating if an NH network supports the long PSP identity. In this way, the signaling overhead for transmitting the long PSP-ID is reduced, so that an RRC message is shortened, the overall signaling overhead is reduced and the network performance is improved. Thus, it is possible to solve the technical problem in the prior art that when a user side inquires a long PSP-ID corresponding to a short PSP-ID from the network side, the long PSP-ID needs to be sent to a network side using an RRC message, so that the length of the RRC message is increased due to the length of the long PSP-ID and thus the signaling overhead is increased and the network performance is degraded.

Optionally, after the second communication protocol message transmitted by the NH network access device is acquired in step S206, the method for transmitting the PSP identity provided by this embodiment of the present disclosure further includes:

step S1, when it is determined according to the second communication protocol message that the NH network supports the long PSP identity, accessing the NH network using the long PSP identity; and step S2, when it is determined according to the second communication protocol message that the NH network does not support the long PSP identity, selecting another NH network.

Optionally, after the received broadcast transmitted by the neutral host (NH) network access device is analyzed to determine if the first short PSP identity corresponding to the long PSP identity to be accessed exists in the first short PSP identity list in the broadcast in step S202, the method for transmitting the PSP identity provided by this embodiment of the present disclosure further includes:

step S203, when it is determined that the first short PSP identity does not exist in the first short PSP identity list, determining whether the broadcast carries additional PSP indication information.

Particularly, when it is determined that the first short PSP identity corresponding to the long PSP identity to be accessed does not exist in the first short PSP identity list in the broadcast, the client needs to determine whether the broadcast carries additional PSP indication information. The additional PSP indication information may instruct the client to further transmit the first communication protocol message to the AP to determine whether the AP supports the long PSP identity to be accessed by the client. If so, step S205 is executed; otherwise step S207 is executed.

In step S205, if the broadcast carries the additional PSP indication information, the first communication protocol message is transmitted to the NH network access device.

Particularly, based on the determination in step S203, if the broadcast carries the additional PSP indication information, it indicates that the AP has the possibility of supporting the long PSP identity to be accessed by the client. At this time, the client needs to transmit the first communication protocol message to the AP to enable the AP to confirm the first communication protocol message.

In step S207, if the broadcast does not carry the additional PSP indication information, another NH network is selected.

Particularly, based on the determination in step S203, if the broadcast does not carry the additional PSP indication information, it indicates that the AP does not support the long PSP identity to be accessed at the client. At this time, the client needs to select another NH network.

With reference to steps S203-S207, if the first short PSP-ID list (namely, the first short PSP identity list in the embodiment of the present disclosure) transmitted by the broadcast does not include the first short PSP-ID (namely, the first short PSP identity in the embodiment of the present disclosure), the client determines whether the broadcast carries the additional PSP indication information (namely, step S203 in the embodiment of the present disclosure). When the broadcast does not carry the additional PSP indication information, the client may determine that the NH network does not support the long PSP-ID to be accessed, and thus the UE selects another NH network to be accessed (namely, step S207 in this embodiment of the present disclosure). When the broadcast carries the additional PSP indication information, it indicates that the NH network supports an additional participating service provider not indicated in the broadcast message. The UE needs to further determine whether the PSP to be accessed exists in the additional PSPs supported by the NH network. Of course, the UE may choose not to access the NH network but to select another NH network (namely, step S205 in the embodiment of the present disclosure). The UE may report related information of the long PSP-ID in the RRC message. The UE may report related information of one or more long PSP-IDs in the RRC message. Here, the related information of the long PSP-ID is compressed information of the long PSP identity in the embodiment of the present disclosure.

Optionally, the step S204 of transmitting the first communication protocol message to the NH network access device when it is determined that the first short PSP identity exists in the first short PSP identity list includes the following steps.

In step 1, when the broadcast does not carry a second short PSP identity list, the first communication protocol message is transmitted to the NH network access device.

Particularly, with reference to the determination of step S202, when the short PSP identity corresponding to the long PSP identity to be accessed exists in the first short PSP identity list in the broadcast transmitted by the AP and received by the client, it is determined whether the broadcast carries a second short PSP identity list. If the broadcast does not carry the second short PSP identity list, it is required to transmit the first communication protocol message to the AP to enable the AP to determine whether it supports a long PSP identity to be accessed by the client according to the first communication protocol message. If the broadcast carries the second short PSP identity list, steps 2 and 3 are executed.

In step 2, when the broadcast carries the second short PSP identity list, it is determined whether a second short PSP identity corresponding to the long PSP identity to be accessed exists in the second short PSP identity list.

Particularly, if the broadcast carries the second short PSP identity list, the client needs to determine if a second short PSP identity corresponding to the long PSP identity to be accessed exists in the second short PSP identity list. When the second short PSP identity corresponding to the long PSP identity to be accessed does not exist in the second short PSP identity list, it indicates that the AP does not support the long PSP identity to be accessed by the client. When the second short PSP identity corresponding to the long PSP identity to be accessed exists in the second short PSP identity list, step 3 is executed.

In step 3, when a second short PSP identity corresponding to the long PSP identity to be accessed exists in the second short PSP identity list, it is determined that the NH network supports the long PSP identity, and the NH network is accessed using the long PSP identity.

Particularly, based on the determination in step 2, if the second short PSP identity list carries the second short PSP identity corresponding to the long PSP identity, it indicates that the AP supports the long PSP identity to be accessed by the client. Thus, the client can access the NH network according to the long PSP identity.

Based on steps 1-3, in the method for transmitting a participating service provider (PSP) identity provided by this embodiment of the present disclosure, a dual determination method is provided. That is, when it is determined that the first short PSP identity corresponding to the long PSP identity to be accessed exists in the first short PSP identity list in the broadcast, it is determined whether the broadcast carries the second short PSP identity list. When the second short PSP identity list exists, it is further determined whether the second short PSP identity corresponding to the long PSP identity to be accessed exists in the second short PSP identity list. When it is determined that the second short PSP identity corresponding to the long PSP identity to be accessed exists in the second short PSP identity list, the client can determine that the AP supports the long PSP identity to be accessed at the client. In addition, the client may access the NH network using the long PSP identity.

It can be seen that the AP transmits the related information of the supported long PSP-ID, i.e., the first short PSP identity list and the second short PSP identity list, or the second short PSP identity list, in the system broadcast, so that at the client side, the long PSP-ID actually supported by the AP can be determined. Therefore, a signaling process in which the client needs an RCC procedure to further determine a long PSP-ID actually supported by the NH network can be avoided, thereby reducing the signaling overhead, and improving the network performance. In addition, by determining whether the first short PSP identity exists and further determining whether the second short PSP identity exists, the client side can determine directly whether the AP supports the long PSP identity to be accessed.

Optionally, the compressed information of the long PSP identity includes:

the second short PSP identity corresponding to the long PSP identity, or the first short PSP identity and the second short PSP identity corresponding to the long PSP identity.

It should be noted that the first short PSP identity corresponding to the long PSP identity can be represented by an index of the first short PSP identity in the first short PSP identity list in the broadcast.

Alternatively, the compressed information of the long PSP identity includes:

a first short PSP identity and first index information corresponding to the long PSP identity, wherein the first index information is index information of the long PSP identity in all long PSP identities covered by the first short PSP identity corresponding to the long PSP identity.

The second short PSP identify is a cyclic redundancy check code sequence of the long PSP identity, or is a sequence obtained by applying a second preset HASH algorithm to the long PSP identity.

The second short PSP identity in the embodiment of the present disclosure is described here by taking the CRC code sequence of the long PSP identity as an example.

If the compressed information of the long PSP identity reported by the client includes the second short PSP identity and the second short PSP identity is a CRC (Cyclic Redundancy Check) code sequence, the client and the AP need to pre-determine a generator polynomial for calculating the CRC of the long PSP identity, and the generator polynomial is denoted as G(x). Each generator polynomial may correspond to a binary sequence. For example, a binary sequence corresponding to CRC8 is 100110001. The highest and lowest bits of G(x) must be 1. If G(x) is R bits, the CRC sequence is R−1 bits. Commonly used CRC generator polynomials include:

$CRC8=X8+X5+X4+1;$ $CRC-CCITT=X16+X12+X5+1;$ $CRC16=X16+X15+X5+1;$ $CRC12=X12+X11+X3+X2+1;$ and $CRC32=X32+X26+X23+X22+X16+X12+X11+X10+X8+X7+X5+X4+X2+X1+1.$ If the binary sequence of the long PSP is K bits, the binary code corresponding to the polynomial r(x) calculated using G(x) is the CRC sequence. A calculation method of r(x) includes: adding (R−1) bits of 0 to the end of the K bits of the long PSP-ID binary sequence; and dividing the result by the binary sequence corresponding to the generator polynomial G(x) (namely, divided by G(x) with binary modulo 2) to obtain a remainder, wherein the remainder is the code corresponding to r(x); and the binary sequence corresponding to r(x) should be R−1 bits. If the binary sequence corresponding to r(x) is less than R−1 bits, 0 is added at the most significant bit.

For example, if the PSP-ID to be transmitted is M=1010001101, and the binary sequence corresponding to the generator polynomial is P=110101 and R=6, 5 zeros are added to the end of M; and then, M is divided by P with modulo 2 to obtain a code 01110 corresponding to the remainder r(x). That is, 01110 is the CRC sequence of the long PSP-ID.

Optionally, the first communication protocol message includes: a radio resource control (RRC) connection establishment request message, and an RRC connection establishment complete message or a dedicated RRC protocol message for inquiring the long PSP identity.

Optionally, the compressed information of the long PSP identity further includes: the first short PSP identity corresponding to the long PSP identity.

Further, optionally, the second communication protocol message carries the compressed information of all long PSP identities corresponding to the first short PSP identity as supported by the NH network.

The compressed information includes a third short PSP identity list. The third short PSP identity is a cyclic redundancy check (CRC) code sequence of all long PSP identities corresponding to the second short PSP identity as supported by the NH network, or is a sequence obtained by applying the second preset HASH algorithm.

Alternatively, the compressed information includes second index information. The second index information is index information of the all long PSP identities corresponding to the first short PSP identity as supported by the NH network in all long PSP identities covered by the first short PSP identity.

Optionally, the step S206 of determining whether the NH network supports the long PSP identity according to the second communication protocol message includes the following steps.

In step 1, when the second communication protocol message carries the third short PSP identity list, the second short PSP identity corresponding to the long PSP identity to be accessed is calculated, and if the second short PSP identity exists in the third short PSP identity list is determined; when the second short PSP identity exists in the third short PSP identity list, it is determined that the NH network supports the long PSP identity to be accessed.

Particularly, after receiving the second communication protocol message returned by the AP, the client parses the second communication protocol message to determine whether the NH network supports the long PSP identity according to the second communication protocol message. When the second communication protocol message carries the third short PSP identity list, the client calculates the second short PSP identity corresponding to the long PSP identity to be accessed, and determines whether the second short PSP identity exists in the third short PSP identity list. When the second short PSP identity exists in the third short PSP identity list, it is determined that the NH network supports the long PSP identity to be accessed.

In step 2, if the second communication protocol message carries the second index information, it is determined whether the second index information includes index information of the long PSP identity to be accessed in all long PSP identities covered by the first short PSP identity is determined. If so, it is determined that the NH network supports the long PSP identity to be accessed.

Particularly, different from step 1, when the second communication protocol message carries the second index information, the client determines whether the second index information includes index information of the long PSP identity to be accessed in all long PSP identities covered by the first short PSP identity. If so, it indicates that the NH network supports the long PSP identity to be accessed.

It can be seen that with the method for transmitting the participating service provider (PSP) identity provided by the embodiment of the present disclosure, in a signaling process in which a client further determines a long PSP identity actually supported by the NH network via an RRC procedure, the client can transmit the compressed information of the long PSP identity in the RRC message, or the AP can transmit the compressed information of the long PSP identity to the UE in the RRC message, so as to replace an actual long PSP identity with long format information. Therefore, extra signaling overhead brought by the transmission of the long PSP-ID is reduced, and the network performance is improved.

Embodiment 2

Figure 3:
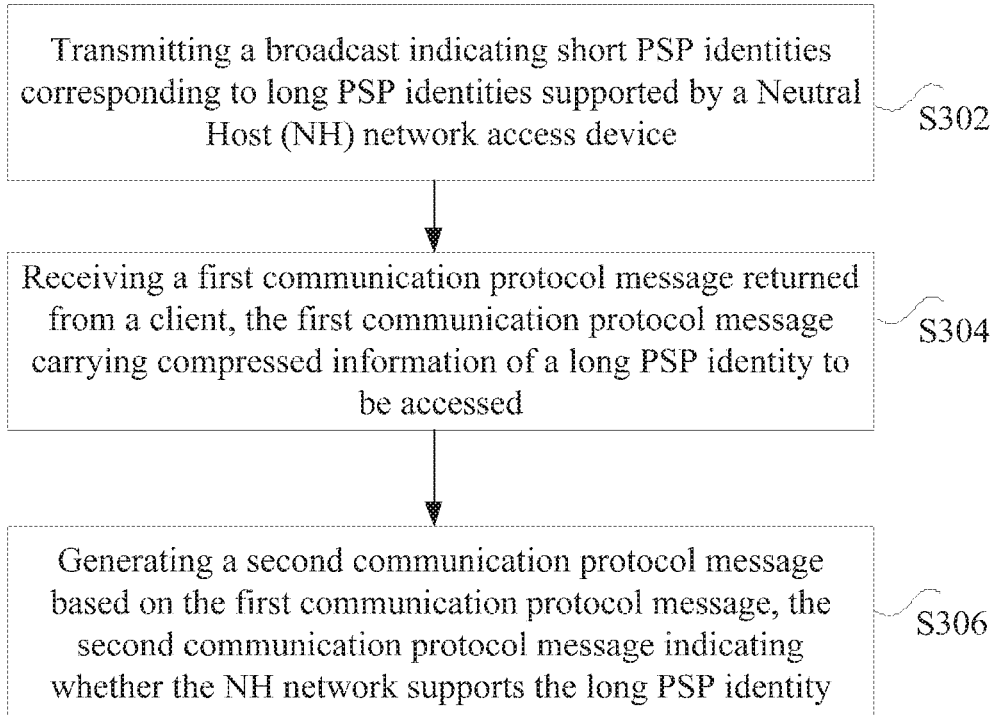
FIG. 3 is a flowchart of a method for transmitting a participating service provider (PSP) identity according to another embodiment of the present disclosure.

FIG. 3 is a flowchart of a method for transmitting a participating service provider (PSP) identity according to another embodiment of the present disclosure. At a neutral host (NH) network access device side, as shown in FIG. 3, the method includes the following steps.

In step S302, a broadcast is transmitted. The broadcast indicates short PSP identities corresponding to long PSP identities supported by a neutral host (NH) network access device.

Particularly, corresponding to the client side in Embodiment 1, the compressed information of the long PSP identity provided by the embodiment of the present disclosure may be applied to the NH network access device side. In the embodiment of the present disclosure, the NH network access device is referred to as an AP. In step S302, the AP transmits a broadcast, so that the short PSP identity corresponding to the long PSP identity supported by the NH network access device can be indicated by the broadcast.

In step S304, a first communication protocol message returned from a client is received, and carries compressed information of a long PSP identity to be accessed.

Particularly, after the broadcast is transmitted in step S302, the AP receives the first communication protocol message returned from the client. The first communication protocol message carries compressed information of the long PSP identity to be accessed, so that at the AP side, it can be determined whether the long PSP identity to be accessed by the client is supported according to the first communication protocol message.

In step S306, a second communication protocol message is generated according to the first communication protocol message, the second communication protocol message indicating if the NH network supports the long PSP identity.

Particularly, based on the received first communication protocol message in step S304, the AP parses the compressed information of the long PSP identity in the first communication protocol message to generate the second communication protocol message. The second communication protocol message may inform the client whether an NH network of a current AP supports the long PSP identity.

With reference to steps S302-S306, after receiving the RRC message used by the client to inquire a long PSP identity, the AP acquires the compressed information of the long PSP identity, determines the long PSP identity to be inquired by the client according to the compressed information, and indicates to the client whether the NH network supports the long PSP identity.

In the method for transmitting a participating service provider (PSP) identity provided by this embodiment of the present disclosure, a broadcast indicating a short PSP identity corresponding to long PSP identity supported by a neutral host (NH) network access device is transmitted. A first communication protocol message returned from a client is received, the first communication protocol message carrying compressed information of a long PSP identity to be accessed. A second communication protocol message is generated according to the first communication protocol message, the second communication protocol message indicating whether the NH network supports the long PSP identity. In this way, the signaling overhead for transmitting the long PSP-ID is reduced, so that an RRC message is shortened, the overall signaling overhead is reduced and the network performance is improved. Thus, it is possible to solve the technical problem in the prior art that when a user side inquires a long PSP-ID corresponding to a short PSP-ID from the network side, the long PSP-ID needs to be sent to a network side using an RRC message, so that the length of the RRC message is increased due to the length of the long PSP-ID and thus the signaling overhead is increased and the network performance is degraded.

Optionally, the compressed information of the long PSP identity includes: a second short PSP identity corresponding to the long PSP identity, or a first short PSP identity and the second short PSP identity corresponding to the long PSP identity.

Alternatively, the compressed information includes a first short PSP identity and first index information corresponding to the long PSP identity. The first index information is index information of the long PSP identity in all long PSP identities covered by the first short PSP identity corresponding to the long PSP identity.

The second short PSP identify is a cyclic redundancy check code sequence of the long PSP identity, or is a sequence obtained by applying a second preset HASH algorithm to the long PSP identity.

Optionally, the first communication protocol message includes: a radio resource control (RRC) connection establishment request message, and an RRC connection establishment complete message or a dedicated RRC protocol message for inquiring the long PSP identity.

Optionally, the step S306 for generating the second communication protocol message according to the first communication protocol message includes:

step 1, when the compressed information of the long PSP identity includes the second short PSP identity, calculating second short PSP identities of all long PSP identities based on a preset polynomial;

step 2, matching the calculated second short PSP identities with the second short PSP identity in the compressed information of the long PSP identity to determine whether there are same identities;

step 3, when there are no same identities, generating the second communication protocol message, the second communication protocol message indicating that the NH network access device does not support the compressed information of the long PSP identity; and step 4, when there are same identities, generating the second communication protocol message, the second communication protocol message indicating that the NH network access device supports the compressed information of the long PSP identity.

With reference to steps 1-4, when the compressed information of the long PSP identity includes the second PSP identity, which is a CRC sequence, the AP uses the predetermined generator polynomial to calculate second short PSP identities, i.e., CRC sequences, of all long PSP identities supported by the NH network. The AP compares the second short PSP identity of each long PSP identity with the second short PSP identity in the compressed information of the long PSP identity included in the first communication protocol message at the client. If at least one of the second short PSP identities of the long PSP identities is the same as the second short PSP identity in the first communication protocol message, it indicates that the NH network supports the long PSP identity to be inquired by the client. Otherwise, it indicates that the NH network does not support the long PSP identity to be inquired by the client.

Optionally, the step S306 of generating the second communication protocol message according to the first communication protocol message includes:

step 5, when the compressed information of the long PSP identity includes the first short PSP identity and the second short PSP identity, determining whether the first short PSP identity in the compressed information of the long PSP identity is the first short PSP identity corresponding to the long PSP identity supported by the NH network access device:

step 6, when there are no same identities, generating the second communication protocol message, the second communication protocol message indicating that the NH network access device does not support the compressed information of the long PSP identity;

step 7, when there are same identities, calculating second short PSP identities corresponding to all long PSP identities supported by the NH network access device based on the preset polynomial, matching the calculated second short PSP identities with the second short PSP identity in the compressed information of the long PSP identity to determine whether there are same identities;

step 8, when it is determined that none of the calculated second short PSP identities is same as the second short PSP identity in the compressed information of the long PSP identity, generating a second communication protocol message, the second communication protocol message indicating that the NH network access device does not support the compressed information of the long PSP identity; and step 9, when it is determined that at least one of the calculated second short PSP identities is the same as the second short PSP identity in the compressed information of the long PSP identity, generating a second communication protocol message, the second communication protocol message indicating that the NH network access device supports the compressed information of the long PSP identity.

Different from steps 1-4, with reference to steps 5-9 in step S306, there is another implementation for step S306 in the embodiment of the present disclosure. If the related information of the long PSP identity reported by the client includes a first short PSP identity and a second short PSP identity (for example, a CRC sequence of the long PSP identity) corresponding to the long PSP identity, the AP first determines the first short PSP identity corresponding to the long PSP identity to be inquired by the client according to the first short PSP identity in the RRC message. When the AP determines that the first short PSP identity in the RRC message does not belong to first short PSP identities corresponding to the long PSP identity supported by the NH network, it indicates that the NH network does not support the long PSP identity to be inquired by the client. When it is determined that the first short PSP identity in the compressed information of the long PSP identity is the short PSP identity corresponding to the long PSP identity supported by the NH network access device, the AP uses a predetermined generator polynomial to calculate second short PSP identities (namely, CRC sequences) of all long PSP identities supported by the NH network access device corresponding to the short PSP identity. The AP compares the second short PSP identity of each long PSP identity with the second PSP identity in the RRC message transmitted by the UE. If the second short PSP identity of the long PSP identity is the same as the second PSP identity in the RRC message, it indicates that the NH network supports the long PSP identity to be inquired by the UE. Otherwise, it indicates that the NH network access device does not support the long PSP identity to be inquired by the client.

Optionally, the step S306 of generating the second communication protocol message according to the first communication protocol message includes:

step 1', when the first communication protocol message is a radio resource control (RRC) protocol connection establishment request message and the NH network access device does not support the compressed information of the long PSP identity, generating a second communication protocol message which is a response message rejecting access by the client; and step 2', when the NH network access device supports the compressed information of the long PSP identity, generating a second communication protocol message which is an RRC protocol connection establishment response message.

Different from the solutions of step 1-4 and the solutions of steps 5-9 in the above step S306, there is another implementation for step S306 in the embodiment of the present disclosure. When the client inquiries the long PSP identity through the RRC protocol and a base station (namely, the AP in the embodiment of the present disclosure) determines that a long PSP identity to be inquired by the client is not supported, the access by the client is rejected, and an RRC connection rejection message (namely, the response message rejecting access by the client in the embodiment of the present disclosure) is transmitted to the client. The response message may further include a rejection reason of not supporting the long PSP identity. When the base station determines that the long PSP identity to be inquired by the client is supported, the client is allowed to be access, and an RRC connection establishment message is transmitted to the client. When the UE receives the RRC connection rejection message carrying the rejection reason of not supporting the long PSP identity and it is determined that the base station actually does not support the long PSP identity desired to be accessed, another NH network is selected.

Optionally, the step S302 of transmitting the broadcast includes: step 1, carrying the first short PSP identity and/or the second short PSP identity in the broadcast according to a preset period.

Particularly, in the embodiment of the present disclosure, when the AP transmits the broadcast, the broadcast may carry the first short PSP identity and the second short PSP identity, or the first short PSP identity, or the second short PSP identity. In order to save air interface resources, only the first short PSP identity is transmitted in the broadcast. The client needs to obtain a long PSP identity actually represented by the first short PSP identity transmitted by the broadcast in the NH network so as to determine whether the NH network supports a specified PSP. The first short PSP identity is a sequence obtained by compressing the long PSP identity using a first preset HASH algorithm predetermined by the client and the AP. The second short PSP identity is a CRC code sequence of a binary sequence of the long PSP identity calculated using the generator polynomial predetermined by the client and the AP, or is a short PSP identity corresponding to the long PSP identity calculated using the second preset HASH algorithm predetermined by the client and the AP.

Optionally, the step 1 of step S302 of carrying the first short PSP identity and/or the second short PSP identity in the broadcast according to the preset period includes the following steps.

In step A, a first short PSP identity and a second short PSP identity are included in the broadcast.

Particularly, based on step 1 in the above step S302, the AP may simultaneously transmit the first short PSP identity and the second short PSP identity corresponding to the long PSP-ID supported by the NH network in the broadcast.

In step B, the first short PSP identity is included in the broadcast transmitted in a first period; and the second short PSP identity is included in the broadcast transmitted in a second period next to the first period.

Particularly, different from step A, the broadcast transmitted by the AP in the first period carries the first short PSP identity, and the broadcast transmitted by the AP in the second period adjacent to the first period carries the second short PSP identity. That is, the AP alternately transmits the first short PSP identity and the second short PSP identity corresponding to the long short PSP identity supported by the NH network in the system broadcast. For example, the AP transmits the first short PSP identity in the 2n-th transmitting period of the broadcast, and transmits the second short PSP identity in the (2n−1)-th transmitting period of the broadcast.

Figure 4:
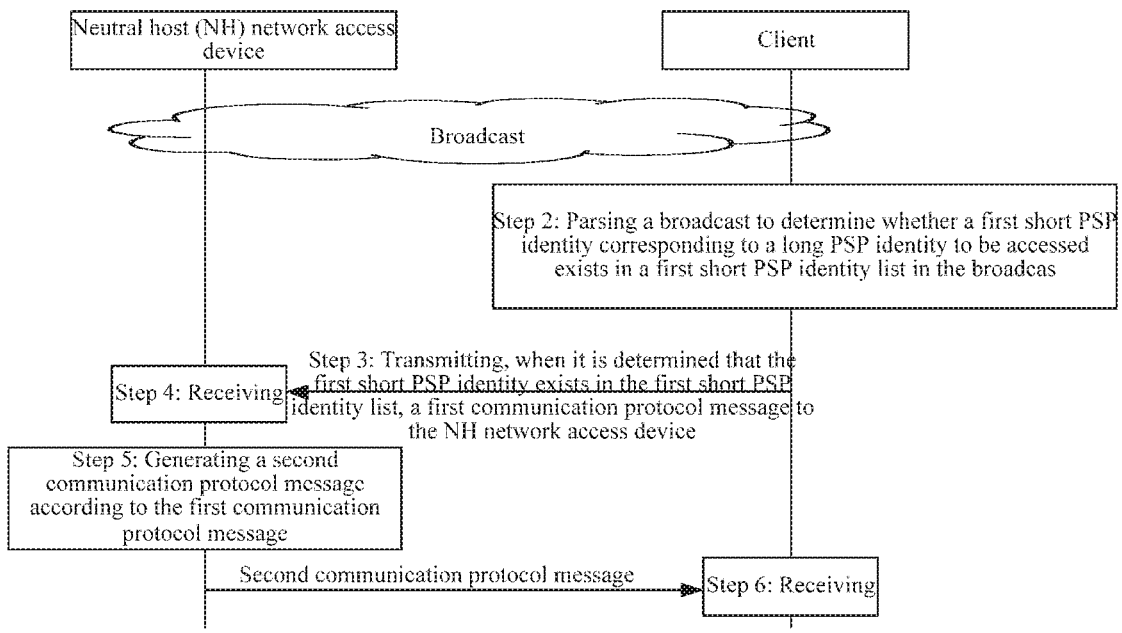
FIG. 4 is an interaction flowchart of a method for transmitting a participating service provider (PSP) identity according to an embodiment of the present disclosure.

Particularly, with reference to a method for transmitting a participating service provider (PSP) identity at the client side provided by Embodiment 1 and a method for transmitting a PSP identity of an NH network access device provided by Embodiment 2, FIG. 4 is an interaction flowchart of a method for transmitting a participating service provider (PSP) identity according to an embodiment of the present disclosure. As shown in FIG. 4, the method for transmitting the PSP identity includes the following steps.

In step 1, an NH network access device transmits a broadcast, the broadcast indicating a short PSP identity corresponding to a long PSP identity supported by the NH network access device.

In step 2, a client parses a previously received broadcast that is transmitted by the NH network access device to determine whether a first short PSP identity corresponding to a long PSP identity to be accessed exists in a first short PSP identity list in the broadcast.

In step 3, if so, the client transmits a first communication protocol message to the NH network access device.

In step 4, the NH network access device receives the first communication protocol message returned from the client.

In step 5, the NH network access device generates a second communication protocol message according to the first communication protocol message.

In step 6, the client receives the second communication protocol message transmitted by the NH network access device.

It can be seen that in a signaling process in which a client further determines a long PSP identity actually supported by the NH network through an RRC procedure, the method for transmitting the participating service provider (PSP) identity provided by the embodiment of the present disclosure can allow the client to transmit compressed information of the long PSP identity in the RRC message, or can allow the AP to transmit the compressed information of the long PSP identity to the UE via an RRC message, so as to replace an actual long PSP identity with long format information. Therefore, extra signaling overhead brought by the transmission of the long PSP-ID is reduced, and the network performance is improved.

In addition, the NH network access device can transmit compressed information of the supported long PSP identity, i.e., the second short PSP identity, in the system broadcast message, so that the client can determine the long PSP identity actually supported by the access device. Therefore, the signaling process in which the client needs an RCC procedure to further determine a long PSP-ID actually supported by the NH network is avoided, thereby reducing the signaling overhead, and improving the network performance.

Embodiment 3

Figure 5:
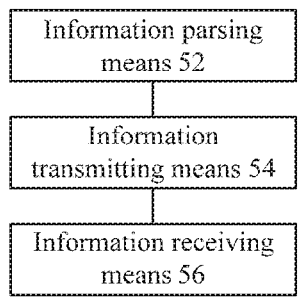
FIG. 5 is a schematic structural diagram of a device for transmitting a participating service provider (PSP) identity according to an embodiment of the present disclosure.

FIG. 5 is a schematic structural diagram of a device for transmitting a participating service provider (PSP) identity according to an embodiment of the present disclosure. As shown in FIG. 5, at a client side, the device for transmitting a participating service provider (PSP) identity includes an information parsing means 52, an information transmitting means 54 and an information receiving means 56.

The information parsing means 52 is configured to parse a previously received broadcast that is transmitted by a Neutral Host (NH) network access device to determine whether a first short PSP identity corresponding to a long PSP identity to be accessed exists in a first short PSP identity list in the broadcast. The first short PSP identity is a sequence obtained by applying a first preset HASH algorithm to the long PSP identity.

The information transmitting means 54 is configured to transmit a first communication protocol message to the NH network access device when it is determined that the first short PSP identity exists in the first short PSP identity list, the first communication protocol message carrying compressed information of the long PSP identity to be accessed.

The information receiving means 56 is configured to acquire a second communication protocol message transmitted by the NH network access device, the second communication protocol message indicating whether an NH network supports the long PSP identity.

In the device for transmitting a participating service provider (PSP) identity provided by this embodiment of the present disclosure, a previously received broadcast that is transmitted by a Neutral Host (NH) network access device is parsed to determine whether a first short PSP identity corresponding to a long PSP identity to be accessed exists in a first short PSP identity list in the broadcast. If so, a first communication protocol message is transmitted to the NH network access device. A second communication protocol message transmitted by the NH network access device is acquired, the second communication protocol message indicating if an NH network supports the long PSP identity. In this way, the signaling overhead for transmitting the long PSP-ID is reduced, so that an RRC message is shortened, the overall signaling overhead is reduced and the network performance is improved. Thus, it is possible to solve the technical problem in the prior art that when a user side inquires a long PSP-ID corresponding to a short PSP-ID from the network side, the long PSP-ID needs to be sent to a network side using an RRC message, so that the length of the RRC message is increased due to the length of the long PSP-ID and thus the signaling overhead is increased and the network performance is degraded.

Optionally, the device for transmitting a participating service provider (PSP) identity provided by this embodiment of the present disclosure further includes:

an accessing means configured to, after acquiring the second communication protocol message transmitted by the NH network access device, access the NH network using the long PSP identity, when it is determined from the second communication protocol message that the NH network supports the long PSP identity; and a network selecting means configured to select another NH network, when it is determined from the second communication protocol message that the NH network does not support the long PSP identity.

Figure 6:
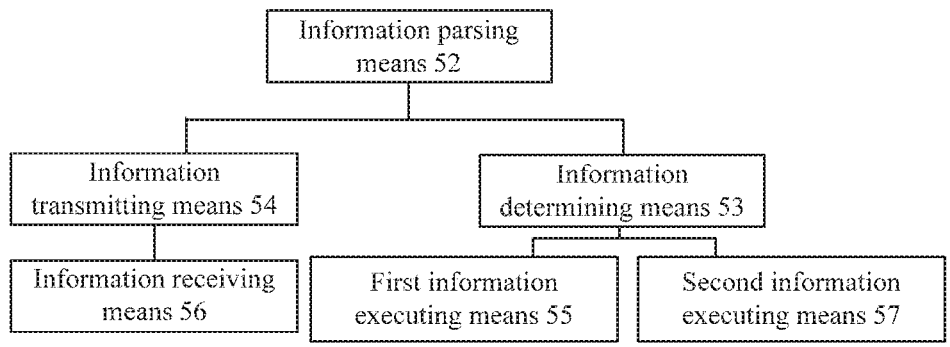
FIG. 6 is a schematic structural diagram of another device for transmitting a participating service provider (PSP) identity according to an embodiment of the present disclosure.

Optionally, FIG. 6 is a schematic structural diagram of another device for transmitting a participating service provider (PSP) identity according to an embodiment of the present disclosure. As shown in FIG. 6, the device for transmitting a participating service provider (PSP) identity provided by this embodiment of the present disclosure further includes an information determining means 53, a first information executing means 55 and a second information executing means 57.

The information determining means 53 is configured to, after parsing the previously received broadcast that is transmitted by the NH network access device to determine whether the first short PSP identity corresponding to the long PSP identity to be accessed exists in the first short PSP identity list in the broadcast: determine, when it is determined that the first short PSP identity does not exist in the first short PSP identity list, whether the broadcast carries additional PSP indication information.

The first information executing means 55 is configured to transmit, when the broadcast carries the additional PSP indication information, the first communication protocol message to the NH network access device.

The second information executing means 57 is configured to select, when the broadcast does not carry the additional PSP indication information, another NH network.

Figure 7:
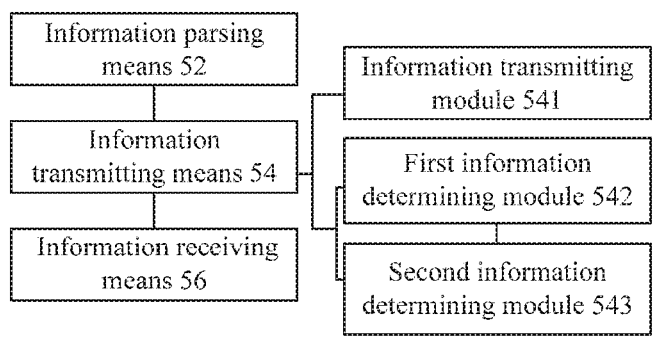
FIG. 7 is a schematic structural diagram of yet another device for transmitting a participating service provider (PSP) identity according to an embodiment of the present disclosure.

Optionally, FIG. 7 is a schematic structural diagram of another device for transmitting a participating service provider (PSP) identity according to an embodiment of the present disclosure. As shown in FIG. 7, the information transmitting means 54 includes an information transmitting module 541, a first information determining module 542 and a second information determining module 543.

The information transmitting module 541 is configured to transmit, when the broadcast does not carry a second short PSP identity list, the first communication protocol message to the NH network access device.

The first information determining module 542 is configured to determine, when the broadcast carries the second short PSP identity list, whether a second short PSP identity corresponding to the long PSP identity to be accessed exists in the second short PSP identity list.

The second information determining module 543 is configured to determine, when a second short PSP identity corresponding to the long PSP identity to be accessed exists in the second short PSP identity list, that the NH network supports the long PSP identity, and access the NH network using the long PSP identity.

Optionally, the compressed information of the long PSP identity includes: a second short PSP identity corresponding to the long PSP identity, or a first short PSP identity and the second short PSP identity corresponding to the long PSP identity.

Alternatively, the compressed information includes a first short PSP identity and first index information corresponding to the long PSP identity, wherein the first index information is index information of the long PSP identity in all long PSP identities covered by the first short PSP identity corresponding to the long PSP identity.

The second short PSP identify is a cyclic redundancy check code sequence of the long PSP identity, or is a sequence obtained by applying a second preset HASH algorithm to the long PSP identity.

Further, optionally, the first communication protocol message includes: a radio resource control (RRC) connection establishment request message, and an RRC connection establishment complete message or a dedicated RRC protocol message for inquiring the long PSP identity.

Optionally, the compressed information of the long PSP identity further includes: a first short PSP identity corresponding to the long PSP identity.

Further, optionally, the second communication protocol message carries the compressed information of all long PSP identities corresponding to the first short PSP identity supported by the NH network.

The compressed information includes a third short PSP identity list. The third short PSP identity is a cyclic redundancy check (CRC) code sequence of all long PSP identities corresponding to the second short PSP identity as supported by the NH network, or is a sequence obtained by applying a second preset HASH algorithm.

Alternatively, the compressed information includes second index information. The second index information is index information of the all long PSP identities corresponding to the first short PSP identity as supported by the NH network in all long PSP identities covered by the first short PSP identity.

Figure 8:
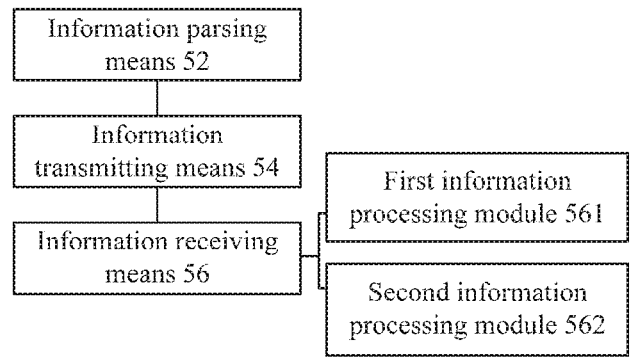
FIG. 8 is a schematic structural diagram of yet another device for transmitting a participating service provider (PSP) identity according to an embodiment of the present disclosure.

Optionally, FIG. 8 is a schematic structural diagram of another device for transmitting a participating service provider (PSP) identity according to another embodiment of the present disclosure. As shown in FIG. 8, the information receiving means 56 includes a first information processing module 561 and a second information processing module 562.

The first information processing module 561 is configured to, when the second communication protocol message carries the third short PSP identity list, calculate a second short PSP identity corresponding to the long PSP identity to be accessed, determine whether the second short PSP identity exists in the third short PSP identity list, and determine that the NH network supports the long PSP identity when the second short PSP identity exists in the third short PSP identity list.

The second information processing module 562 is configured to, when the second communication protocol message carries the second index information, determine whether the second index information includes index information of the long PSP identity to be accessed in all long PSP identities covered by the first short PSP identity, and if so, determine that the NH network supports the long PSP identity.

Embodiment 4

Figure 9:
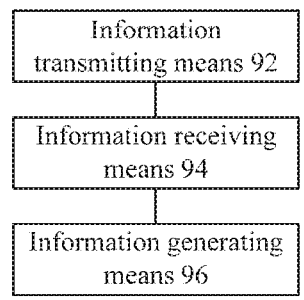
FIG. 9 is a schematic structural diagram of a device for transmitting a participating service provider (PSP) identity according to yet another embodiment of the present disclosure.

FIG. 9 is a schematic structural diagram of a device for transmitting a participating service provider (PSP) identity according to yet another embodiment of the present disclosure. As shown in FIG. 9, at the NH network access device side, the device for transmitting a participating service provider (PSP) identity includes an information transmitting means 92, an information receiving means 94 and an information generating means 96.

The information transmitting means 92 is configured to transmit a broadcast indicating short PSP identities corresponding to long PSP identities supported by a Neutral Host (NH) network access device.

The information receiving means 94 is configured to receive a first communication protocol message returned from a client, the first communication protocol message carrying compressed information of a long PSP identity to be accessed.

The information generating means 96 is configured to generate a second communication protocol message based on the first communication protocol message, the second communication protocol message indicating whether the NH network supports the long PSP identity.

In the device for transmitting a participating service provider (PSP) identity provided by this embodiment of the present disclosure, a previously received broadcast that is transmitted by a Neutral Host (NH) network access device is parsed to determine whether a first short PSP identity corresponding to a long PSP identity to be accessed exists in a first short PSP identity list in the broadcast. If so, a first communication protocol message is transmitted to the NH network access device. A second communication protocol message transmitted by the NH network access device is acquired, the second communication protocol message indicating if an NH network supports the long PSP identity. In this way, the signaling overhead for transmitting the long PSP-ID is reduced, so that an RRC message is shortened, the overall signaling overhead is reduced and the network performance is improved. Thus, it is possible to solve the technical problem in the prior art that when a user side inquires a long PSP-ID corresponding to a short PSP-ID from the network side, the long PSP-ID needs to be sent to a network side using an RRC message, so that the length of the RRC message is increased due to the length of the long PSP-ID and thus the signaling overhead is increased and the network performance is degraded.

Optionally, the compressed information of the long PSP identity includes: a second short PSP identity corresponding to the long PSP identity, or a first short PSP identity and the second short PSP identity corresponding to the long PSP identity.

Alternatively, the compressed information includes a first short PSP identity and first index information corresponding to the long PSP identity. The first index information is index information of the long PSP identity in all long PSP identities covered by the first short PSP identity corresponding to the long PSP identity.

The second short PSP identify is a cyclic redundancy check (CRC) code sequence of the long PSP identity, or is a sequence obtained by applying a second preset HASH algorithm to the long PSP identity.

Further, optionally, the first communication protocol message includes: a radio resource control (RRC) connection establishment request message, and an RRC connection establishment complete message or a dedicated RRC protocol message for inquiring the long PSP identity.

Figure 10:
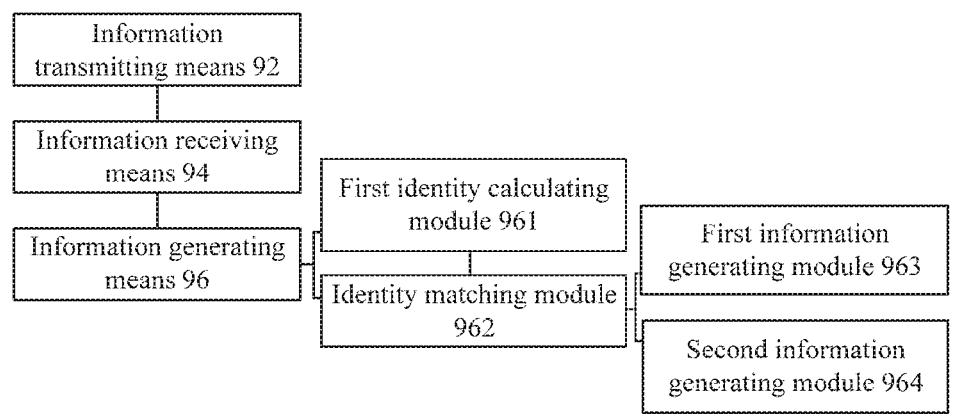
FIG. 10 is a schematic structural diagram of yet another device for transmitting a participating service provider (PSP) identity according to an embodiment of the present disclosure.

Optionally, FIG. 10 is a schematic structural diagram of yet another device for transmitting a participating service provider (PSP) identity according to another embodiment of the present disclosure. As shown in FIG. 10, the information generating means 96 includes a first identity calculating module 963, an identity matching module 962, a first information generating module 963 and a second information generating module 964.

The first identity calculating module 961 is configured to calculate, when the compressed information of the long PSP identity includes the second short PSP identity, second short PSP identities of all long PSP identities based on a preset polynomial.

The identity matching module 962 is configured to match the calculated second short PSP identities with the second short PSP identity in the compressed information of the long PSP identity to determine whether there are same identities.

The first information generating module 963 is configured to, when there are no same identities, generate the second communication protocol message, the second communication protocol message indicating that the NH network access device does not support the compressed information of the long PSP identity.

The second information generating module 964 is configured to generate, when there are same identities, the second communication protocol message, the second communication protocol message indicating that the NH network access device does not support the compressed information of the long PSP identity.

Figure 11:
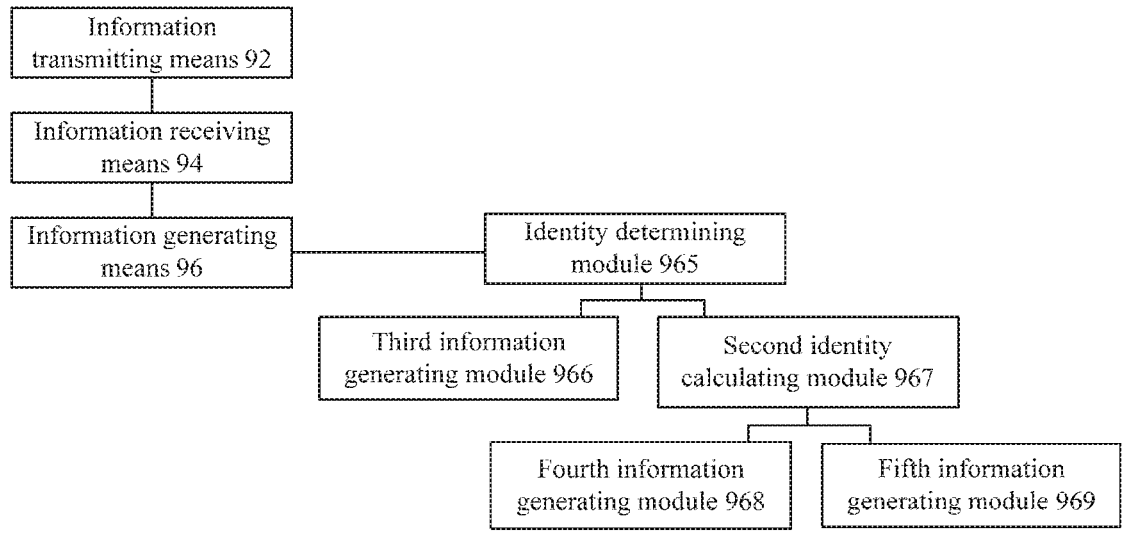
FIG. 11 is a schematic structural diagram of yet another device for transmitting a participating service provider (PSP) identity according to yet another embodiment of the present disclosure.

Optionally, FIG. 11 is a schematic structural diagram of yet another device for transmitting a participating service provider (PSP) identity according to another embodiment of the present disclosure. As shown in FIG. 11, the information generating means 96 includes an identity determining module 965, a third information generating module 966, a second identity calculating module 967, a fourth information generating module 968 and a fifth information generating module 969.

The identity determining module 965 is configured to determine, when the compressed information of the long PSP identity includes the first short PSP identity and the second short PSP identity, whether the first short PSP identity in the compressed information of the long PSP identity is a first short PSP identity corresponding to the long PSP identity supported by the NH network access device.

The third information generating module 966 is configured to generate, when there are no same identities, the second communication protocol message, the second communication protocol message indicating that the NH network access device supports the compressed information of the long PSP identity.

The second identity calculating module 967 is configured to calculate, when there are same identities, second short PSP identities corresponding to all long PSP identities supported by the NH network access device based on a preset polynomial, and match the calculated second short PSP identities with the second short PSP identity in the compressed information of the long PSP identity to determine whether there are same identities.

The fourth information generating module 968 is configured to generate, when it is determined that none of the calculated second short PSP identities is same as the second short PSP identity in the compressed information of the long PSP identity, the second communication protocol message, the second communication protocol message indicating that the NH network access device does not support the compressed information of the long PSP identity.

The fifth information generating module 969 is configured to generate, when it is determined that at least one of calculated second short PSP identities is the same as the second short PSP identity in the compressed information of the long PSP identity, the second communication protocol message, the second communication protocol message indicating that the NH network access device supports the compressed information of the long PSP identity.

Figure 12:
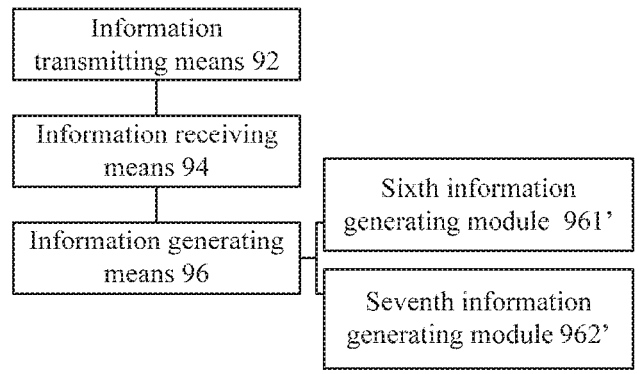
FIG. 12 is a schematic structural diagram of yet another device for transmitting a participating service provider (PSP) identity according to yet another embodiment of the present disclosure.

Optionally, FIG. 12 is a schematic structural diagram of another device for transmitting a participating service provider (PSP) identity according to another embodiment of the present disclosure. As shown in FIG. 12, the information generating means 96 includes a sixth information generating module 961' and a seventh information generating module 962'.

The sixth information generating module 961' is configured to generate, when the first communication protocol message is a Radio Resource Control (RRC) protocol connection establishment request message and the NH network access device does not support the compressed information of the long PSP identity, the second communication protocol message which is a response message rejecting access by the client.

The seventh information generating module 962' is configured to generate, when the NH network access device supports the compressed information of the long PSP identity, the second communication protocol message which is an RRC protocol connection establishment response message.

Figure 13:
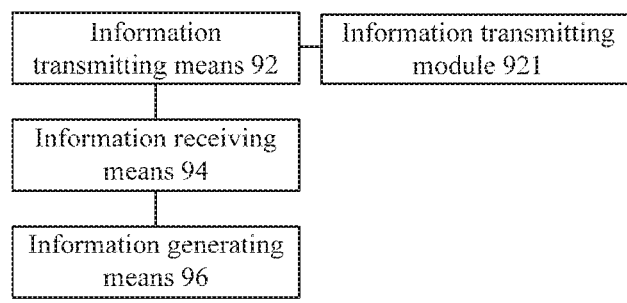
FIG. 13 is a schematic structural diagram of yet another device for transmitting a participating service provider (PSP) identity according to yet another embodiment of the present disclosure.

Optionally, FIG. 13 is a schematic structural diagram of another device for transmitting a participating service provider (PSP) identity according to yet another embodiment of the present disclosure. As shown in FIG. 13, the information transmitting means 92 includes an information transmitting module 921.

The information transmitting module 921 is configured to include the first short PSP identity and/or the second short PSP identity in the broadcast according to a preset period.

Figure 14:
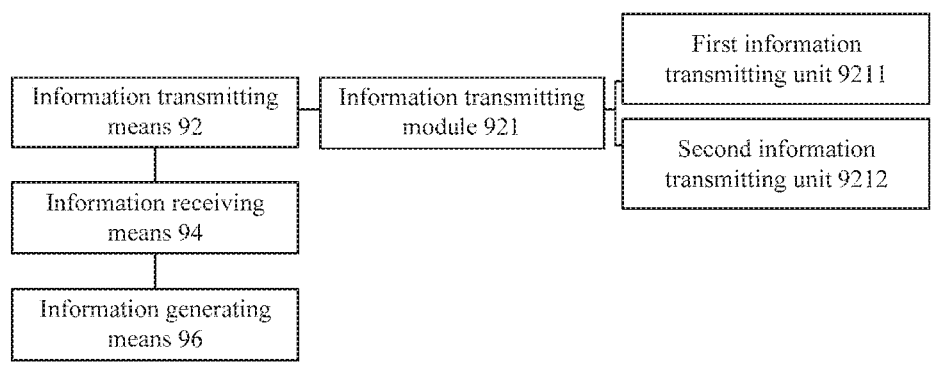
FIG. 14 is a schematic structural diagram of yet another device for transmitting a participating service provider (PSP) identity according to yet another embodiment of the present disclosure.

Optionally. FIG. 14 is a schematic structural diagram of another device for transmitting a participating service provider (PSP) identity according to yet another embodiment of the present disclosure. As shown in FIG. 14, the information transmitting module 921 includes a first information transmitting unit 9211 and a second information transmitting unit 9212.

The first information transmitting unit 9211 is configured to include the first short PSP identity and the second short PSP identity in the broadcast.

The second information transmitting unit 9212 is configured to include the first short PSP identity in the broadcast transmitted in a first period, and include the second short PSP identity in the broadcast transmitted in a second period adjacent to the first period.

Embodiment 5

Figure 15:
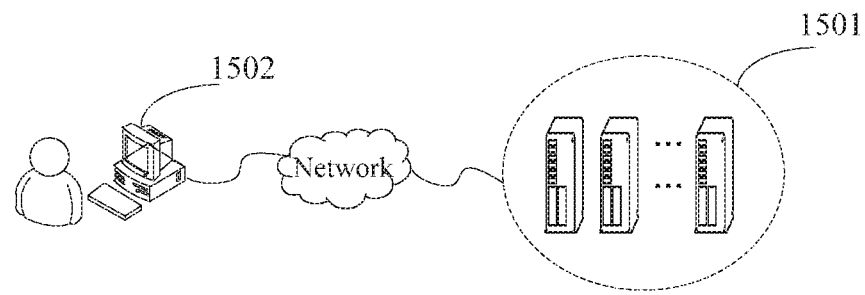
FIG. 15 is a schematic structural diagram of a system for transmitting a participating service provider (PSP) identity according to an embodiment of the present disclosure.

FIG. 15 is a schematic structural diagram of a system for transmitting a participating service provider (PSP) identity according to an embodiment of the present disclosure. As shown in FIG. 15, the system includes a neutral host (NH) network access device 1501 and a client 1502 which are communicatively connected with each other, wherein the client 1502 is one of the devices for transmitting a participating service provider (PSP) identity shown in FIGS. 5-8, and the NH network access device 1501 is one of the devices for transmitting a participating service provider (PSP) identity shown in FIGS. 9-14.

In the transmission system of a participating service provider (PSP) identity provided by this embodiment of the present disclosure, a previously received broadcast that is transmitted by a Neutral Host (NH) network access device is parsed to determine whether a first short PSP identity corresponding to a long PSP identity to be accessed exists in a first short PSP identity list in the broadcast. The first short PSP identity is a sequence obtained by applying a first preset HASH algorithm to the long PSP identity. If so, a first communication protocol message is transmitted to the NH network access device. The first communication protocol message carries compressed information of the long PSP identity to be accessed. A second communication protocol message transmitted by the NH network access device is acquired, the second communication protocol message indicating if an NH network supports the long PSP identity. When it is determined from the second communication protocol message that the NH network supports the long PSP identity, the NH network is accessed using the long PSP identity. When it is determined from the second communication protocol message that the NH network does not support the long PSP identity, another NH network is selected. In this way, the signaling overhead for transmitting the long PSP-ID is reduced, so that an RRC message is shortened, the overall signaling overhead is reduced and the network performance is improved. Thus, it is possible to solve the technical problem in the prior art that when a user side inquires a long PSP-ID corresponding to a short PSP-ID from the network side, the long PSP-ID needs to be sent to a network side using an RRC message, so that the length of the RRC message is increased due to the length of the long PSP-ID and thus the signaling overhead is increased and the network performance is degraded.

Embodiment 6

This embodiment provides a non-transitory computer-readable storage medium storing computer instructions causing a computer to perform the method in Embodiment 1.

Embodiment 7

This embodiment provides a computer program product, including a computer program stored on a non-transitory computer readable storage medium, the computer program including program instructions which, when executed by a computer, cause the computer to perform the method in Embodiment 1.

Embodiment 8

This embodiment provides a non-transitory computer-readable storage medium storing computer instructions causing a computer to perform the method in Embodiment 2.

Embodiment 9

This embodiment provides a computer program product, including a computer program stored on a non-transitory computer readable storage medium, the computer program including program instructions which, when executed by a computer, cause the computer to perform the method in Embodiment 2.

Embodiment 10

Figure 16:
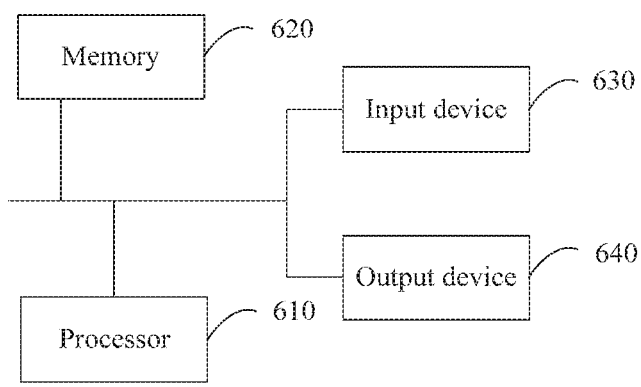
FIG. 16 is a schematic structural diagram of an electronic device for transmitting a participating service provider (PSP) identity according to an embodiment of the present disclosure.

FIG. 16 is a schematic structural diagram of an electronic device for transmitting a participating service provider (PSP) identity according to an embodiment of the present disclosure. As shown in FIG. 16, the electronic device includes one or more processors 610 and a memory 620. One processor 610 is exemplified in FIG. 16.

The electronic device may further include an input device 630 and an output device 640.

The processor 610, the memory 620, the input device 630 and the output device 640 may be connected through a bus or by other means. Connection by means of the bus is taken as an example in FIG. 16.

As a non-transient computer readable storage medium, the memory 620 may be configured to store a non-transient software program, a non-transient computer executable program and a module, for example, a program instruction/module (for example, the information parsing means 52, the information transmitting means 54 and the information receiving means 56 as shown in FIG. 5) corresponding to the method for transmitting a participating service provider (PSP) identity in the embodiments of the present disclosure. The processor 610 executes various functional applications and data processing of a server through running of the non-transient software program, instruction and module stored in the memory 620. That is, the method for transmitting a participating service provider (PSP) identity in the above embodiments is realized.

The memory 620 may include a program memory area and a data memory area. The program memory area may store an operating system and an application program required by at least one function. The data memory area may store data that are built in accordance with application of the device for transmitting a participating service provider (PSP) identity, etc. Besides, the memory 620 may include a high-speed random access memory, and may further include a non-transient memory, such as at least one disk memory, a flash memory or other non-transient solid-state memories. In some embodiments, the memory 620 optionally includes memories which are remotely disposed relative to the processor 610. These remote memories may be connected to the device for transmitting a participating service provider (PSP) identity through networks which include but not limited to Internet, Intranet, local area network, mobile radio communications and a combination thereof.

The input device 630 may receive input digital or character information and generate key signal inputs relevant to UE settings and functional control of the device for transmitting a participating service provider (PSP) identity. The output device 640 may include such display equipment as a display screen.

The one or more modules are stored in the memory 620. When the modules are executed by one or more processors 610, the method for transmitting a participating service provider (PSP) identity in any above method embodiment is executed.

The electronic device may execute the method provided by Embodiment 1 of the present disclosure and has corresponding functional modules and beneficial effects for executing the method. The technical details not described in the present embodiment refer to the method provided by Embodiment 1 of the present disclosure.

Embodiment 11

Figure 17:
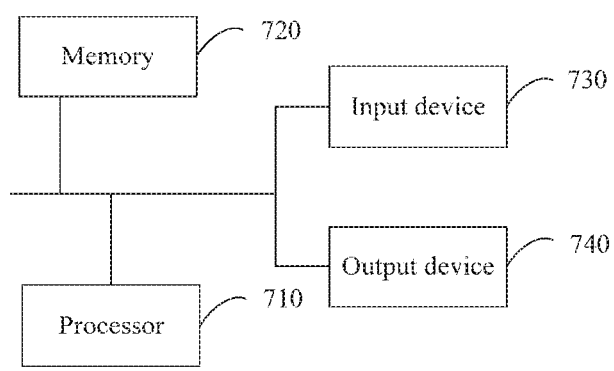
FIG. 17 is a schematic structural diagram of an electronic device for transmitting a participating service provider (PSP) identity according to another embodiment of the present disclosure.

FIG. 17 is a schematic structural diagram of an electronic device for transmitting a participating service provider (PSP) identity according to another embodiment of the present disclosure. As shown in FIG. 17, the electronic device includes one or more processors 710 and a memory 720. One processor 710 is exemplified in FIG. 17.

The electronic device may further include an input device 730 and an output device 740.

The processor 710, the memory 720, the input device 730 and the output device 740 may be connected through a bus or by other means. Connection by means of the bus is taken as an example in FIG. 17.

As a non-transient computer readable storage medium, the memory 720 may be configured to store a non-transient software program, a non-transient computer executable program and a module, for example, a program instruction/ module (for example, the information transmitting means 92, the information receiving means 94 and the information generating means 96 as shown in FIG. 9) corresponding to the method for transmitting a participating service provider (PSP) identity in the embodiments of the present disclosure. The processor 710 executes various functional applications and data processing of a server through running of the non-transient software program, instruction and module stored in the memory 720. That is, the method for transmitting a participating service provider (PSP) identity in the above embodiments is realized.

The memory 720 may include a program memory area and a data memory area. The program memory area may store an operating system and an application program required by at least one function. The data memory area may store data that are built in accordance with application of the device for transmitting a participating service provider (PSP) identity, etc. Besides, the memory 720 may include a high-speed random access memory, and may further include a non-transient memory, such as at least one disk memory, a flash memory or other non-transient solid-state memories. In some embodiments, the memory 720 optionally includes memories which are remotely disposed relative to the processor 710. These remote memories may be connected to the device for transmitting a participating service provider (PSP) identity through networks which include but not limited to Internet. Intranet, local area network, mobile radio communications and a combination thereof.

The input device 730 may receive input digital or character information and generate key signal inputs relevant to UE settings and functional control of the device for transmitting a participating service provider (PSP) identity. The output device 740 may include such display equipment as a display screen.

The one or more modules are stored in the memory 720. When the modules are executed by one or more processors 710, the method for transmitting a participating service provider (PSP) identity in any above method embodiment is executed.

The electronic device may execute the method provided by Embodiment 2 of the present disclosure and has corresponding functional modules and beneficial effects for executing the method. The technical details not described in the present embodiment refer to the method provided by Embodiment 2 of the present disclosure.

The electronic device provided by the embodiment of the present disclosure exists in various forms, including but not limited to the followings.

(1) Mobile communication equipment: those having the feature of a mobile communication function and the main objective of providing voice and data communication, and including a smart phone (e.g., iPhone), a multimedia mobile phone, a functional mobile phone, a low-end mobile phone, etc.

(2) Ultra-mobile personal computer equipment: those belonging to personal computers, having computing and processing functions, generally having a mobile Internet access feature and including PDAs, MIDs, UMPCs, etc., for example, iPads.

(3) Portable recreation equipment: those being capable of displaying and broadcasting multimedia contents and including audio and video players (e.g., iPods), a hand-held game player, an e-book, intelligent toys and portable vehicle-mounted navigation equipment.

(4) Servers: those providing computing service and including a processor, a hard disk, an internal memory, a system bus, etc., having a similar architecture to a universal computer and placing higher demands on the processing capability, the stability, the reliability, the security, the expandability, the manageability, etc., due to the need for providing high-reliability services.

(5) Other electronic devices with data interaction functions.

The serial numbers of the embodiments of the present disclosure are merely for description, and do not represent the advantages and disadvantages of the embodiments.

In the above-mentioned embodiments of the present disclosure, the descriptions of the embodiments have their respective emphases. For the parts that are not detailed in a certain embodiment, refer to the related descriptions of other embodiments.

It should be understood that in the embodiments provided by the present disclosure, the disclosed technical contents may be realized by other means. The device embodiments described above are merely schematic. For example, the partitioning of the units may be a logical functional partitioning. There may be other partitioning modes during actual implementation. For example, multiple units or components may be combined or integrated into another system, or some features may be ignored or not executed. In addition, mutual coupling or direct coupling or communication connection that is shown or discussed may be indirect coupling or communication connection through some interfaces, units or modules, and may be in electrical or other forms.

The units described as separate components may or may not be physically separated, and the components for unit display may or may not be physical units, that is, may be located in one place or distributed on a plurality of units. Part or all of the units may be selected according to actual needs to achieve the objective of the solutions of the embodiments.

In addition, all functional units in the embodiments of the present disclosure may be integrated into one processing unit. Or, each unit exists physically independently. Or, two or more units may be integrated into one unit. The above integrated units may be realized in the form of hardware or a software functional unit.

The integrated units, if realized in the form of the software functional unit and sold or used as a standalone product, may be stored in a computer readable storage medium. Based on such understanding, the technical solution of the present disclosure in essence, or a part that contributes to the prior art, or all or part of the technical solution, may be embodied in the form of a software product. The computer software product is stored in a storage medium and includes a plurality of instructions for a computer device (which may be a personal computer, a server, a network device or the like) to perform all or part of the steps of the method described in the embodiments of the present disclosure. The foregoing storage medium includes: a USB flash disk, a Read-Only Memory (ROM), a Random Access Memory (RAM), a removable hard disk, a magnetic disk, an optical disk, or other various media that may store program codes.

The above description merely describes implementations of the present disclosure, and it should be noted that those skilled in the art can also make various improvements and modifications without departing from the principle of the present disclosure. These improvements and modifications should be considered to be within the scope of protection of the present disclosure.

What is claimed is:

1. A method for transmitting a Participating Service Provider (PSP) identity, comprising:
    parsing a previously received broadcast that is transmitted by a Neutral Host (NH) network access device to determine whether a first short PSP identity corresponding to a long PSP identity to be accessed exists in a first short PSP identity list in the broadcast;
    transmitting a first communication protocol message to the NH network access device when it is determined that the first short PSP identity exists in the first short PSP identity list, the first communication protocol message carrying compressed information of the long PSP identity to be accessed; and
    acquiring a second communication protocol message transmitted by the NH network access device, the second communication protocol message indicating whether an NH network supports the long PSP identity.

2. The method according to claim 1, wherein the compressed information of the long PSP identity comprises:
    the second short PSP identity corresponding to the long PSP identity, or
    the first short PSP identity and the second short PSP identity corresponding to the long PSP identity, or
    the first short PSP identity and first index information corresponding to the long PSP identity, wherein the first index information is index information of the long PSP identity in all long PSP identities covered by the first short PSP identity corresponding to the long PSP identity; and
    the second short PSP identify is a Cyclic Redundancy Check (CRC) code sequence of the long PSP identity, or a sequence obtained by applying a second preset HASH algorithm to the long PSP identity.

3. The method according to claim 1, wherein the compressed information of the long PSP identity comprises the first short PSP identity corresponding to the long PSP identity.

4. The method according to claim 3, wherein the second communication protocol message carries compressed information of all long PSP identities corresponding to the first short PSP identity as supported by the NH network; and the compressed information comprises:
    a third short PSP identity list, wherein the third short PSP identity is a Cyclic Redundancy Check (CRC) code sequence of all long PSP identities corresponding to the second short PSP identity as supported by the NH network, or a sequence obtained by applying a second preset HASH algorithm; or
    second index information which is index information of all long PSP identities corresponding to the first short PSP identity as supported by the NH network in all long PSP identities covered by the first short PSP identity.

5. A method for transmitting a Participating Service Provider (PSP) identity, comprising:
    transmitting a broadcast indicating short PSP identities corresponding to long PSP identities supported by a Neutral Host (NH) network access device;
    receiving a first communication protocol message returned from a client, the first communication protocol message carrying compressed information of a long PSP identity to be accessed; and
    generating a second communication protocol message based on the first communication protocol message, the second communication protocol message indicating whether the NH network supports the long PSP identity.

6. The method according to claim 5, wherein the compressed information of the long PSP identity comprises:
    a second short PSP identity corresponding to the long PSP identity, or
    a first short PSP identity and the second short PSP identity corresponding to the long PSP identity, or
    the first short PSP identity and first index information corresponding to the long PSP identity, wherein the first index information is index information of the long PSP identity in all long PSP identities covered by the first short PSP identity corresponding to the long PSP identity; and
    the second short PSP identify is a Cyclic Redundancy Check (CRC) code sequence of the long PSP identity, or a sequence obtained by applying a second preset HASH algorithm to the long PSP identity.

7. The method according to claim 6, wherein the first communication protocol message comprises: a Radio Resource Control (RRC) connection establishment request message, and an RRC connection establishment complete message or a dedicated RRC protocol message for inquiring the long PSP identity.

8. The method according to claim 7, wherein said generating the second communication protocol message based on the first communication protocol message comprises:
   calculating, when the compressed information of the long PSP identity includes the second short PSP identity, second short PSP identities of all long PSP identities based on a preset polynomial; and
   matching the calculated second short PSP identities with the second short PSP identity in the compressed information of the long PSP identity to determine whether there are same identities.

9. The method according to claim 7, wherein said generating the second communication protocol message based on the first communication protocol message comprises:
   determining, when the compressed information of the long PSP identity includes the first short PSP identity and the second short PSP identity, whether the first short PSP identity in the compressed information of the long PSP identity is a first short PSP identity corresponding to the long PSP identity supported by the NH network access device.

10. The method according to claim 6, wherein said transmitting the broadcast comprises:
    including the first short PSP identity and/or the second short PSP identity in the broadcast according to a preset period.

11. The method according to claim 10, wherein said including the first short PSP identity and/or the second short PSP identity in the broadcast according to the preset period comprises:
    including the first short PSP identity and the second short PSP identity in the broadcast.

12. A device for transmitting a Participating Service Provider (PSP) identity, comprising:
    an information parsing means configured to parse a previously received broadcast that is transmitted by a Neutral Host (NH) network access device to determine whether a first short PSP identity corresponding to a long PSP identity to be accessed exists in a first short PSP identity list in the broadcast;
    an information transmitting means configured to transmit a first communication protocol message to the NH network access device when it is determined that the first short PSP identity exists in the first short PSP identity list, the first communication protocol message carrying compressed information of the long PSP identity to be accessed; and
    an information receiving means configured to acquire a second communication protocol message transmitted by the NH network access device, the second communication protocol message indicating whether an NH network supports the long PSP identity.

13. The device according to claim 12, wherein the compressed information of the long PSP identity comprises:
    the second short PSP identity corresponding to the long PSP identity, or
    the first short PSP identity and the second short PSP identity corresponding to the long PSP identity, or
    the first short PSP identity and first index information corresponding to the long PSP identity, wherein the first index information is index information of the long PSP identity in all long PSP identities covered by the first short PSP identity corresponding to the long PSP identity; and
    the second short PSP identify is a Cyclic Redundancy Check (CRC) code sequence of the long PSP identity, or a sequence obtained by applying a second preset HASH algorithm to the long PSP identity.

14. The device according to claim 12, wherein the compressed information of the long PSP identity comprises a first short PSP identity corresponding to the long PSP identity.

15. The device according to claim 14, wherein the second communication protocol message carries compressed information of all long PSP identities corresponding to the first short PSP identity as supported by the NH network; and the compressed information comprises:
    a third short PSP identity list, wherein the third short PSP identity is a Cyclic Redundancy Check (CRC) code sequence of all long PSP identities corresponding to the second short PSP identity as supported by the NH network, or a sequence obtained by applying a second preset HASH algorithm; or
    second index information which is index information of all long PSP identities corresponding to the first short PSP identity as supported by the NH network in all long PSP identities covered by the first short PSP identity.

16. A device for transmitting a Participating Service Provider (PSP) identity, comprising:
    an information transmitting means configured to transmit a broadcast indicating short PSP identities corresponding to long PSP identities supported by a Neutral Host (NH) network access device;
    an information receiving means configured to receive a first communication protocol message returned from a client, the first communication protocol message carrying compressed information of a long PSP identity to be accessed; and
    an information generating means configured to generate a second communication protocol message based on the first communication protocol message, the second communication protocol message indicating whether the NH network supports the long PSP identity.

17. The device according to claim 16, wherein the compressed information of the long PSP identity comprises:
    a second short PSP identity corresponding to the long PSP identity, or
    a first short PSP identity and the second short PSP identity corresponding to the long PSP identity, or
    the first short PSP identity and first index information corresponding to the long PSP identity, wherein the first index information is index information of the long PSP identity in all long PSP identities covered by the first short PSP identity corresponding to the long PSP identity; and
    the second short PSP identify is a Cyclic Redundancy Check (CRC) code sequence of the long PSP identity, or a sequence obtained by applying a second preset HASH algorithm to the long PSP identity.

18. The device according to claim 17, wherein the first communication protocol message comprises: a Radio Resource Control (RRC) connection establishment request message, and an RRC connection establishment complete message or a dedicated RRC protocol message for inquiring the long PSP identity.

19. The device according to claim 18, wherein the information generating means comprises:
    a first identity calculating module configured to calculate, when the compressed information of the long PSP identity includes the second short PSP identity, second short PSP identities of all long PSP identities based on a preset polynomial; and an identity matching module configured to match the calculated second short PSP identities with the second short PSP identity in the compressed information of the long PSP identity to determine whether there are same identities.

20. A system for transmitting a Participating Service Provider (PSP) identity, comprising: a Neutral Host (NH) network access device and a client which are communicatively connected with each other, wherein the client is a device for transmitting the PSP identity, and the NH network access device is a device for transmitting the PSP identity, the device for transmitting the PSP identity comprises:

an information parsing means configured to parse a previously received broadcast that is transmitted by the NH network access device to determine whether a first short PSP identity corresponding to a long PSP identity to be accessed exists in a first short PSP identity list in the broadcast;

an information transmitting means configured to transmit a first communication protocol message to the NH network access device when it is determined that the first short PSP identity exists in the first short PSP identity list, the first communication protocol message carrying compressed information of the long PSP identity to be accessed; and an information receiving means configured to acquire a second communication protocol message transmitted by the NH network access device, the second communication protocol message indicating whether an NH network supports the long PSP identity, and the device for transmitting the PSP identity comprises:

an information transmitting means configured to transmit a broadcast indicating short PSP identities corresponding to long PSP identities supported by the NH network access device;

an information receiving means configured to receive a first communication protocol message returned from a client, the first communication protocol message carrying compressed information of a long PSP identity to be accessed; and an information generating means configured to generate a second communication protocol message based on the first communication protocol message, the second communication protocol message indicating whether the NH network supports the long PSP identity.

* * * * *